July 14, 1964 W. A. LANG 3,141,059
RECEPTACLE MOUNTING PLATE
Filed Oct. 29, 1962 2 Sheets-Sheet 1

INVENTOR.
William A. Lang
BY
Webb Mackey + Burden
HIS ATTORNEYS

July 14, 1964     W. A. LANG     3,141,059
RECEPTACLE MOUNTING PLATE

Filed Oct. 29, 1962     2 Sheets-Sheet 2

INVENTOR.
William A. Lang
BY
HIS ATTORNEYS

United States Patent Office 3,141,059
Patented July 14, 1964

3,141,059
RECEPTACLE MOUNTING PLATE
William A. Lang, Pittsburgh, Pa., assignor to Steel City Electric Company, Pittsburgh, Pa.
Filed Oct. 29, 1962, Ser. No. 233,717
2 Claims. (Cl. 174—57)

This application relates to a receptacle mounting plate, more particularly to a receptacle mounting plate for electrical floor boxes.

Electrical floor boxes are designed to provide an electrical outlet in concrete or wood floors. They are connected to conduit runs or raceway and positioned in the wood floor or concrete forms so that the top surface of covers for the boxes will be flush with the top surface of the finished floor. The necessary wiring is then pulled through the conduit or raceway to each floor box. The cover or the box carries a threaded plug, which, when removed exposes a receptacle connected to the wiring. An attachment plug or electrical appliance plug can then be inserted into the exposed receptacle.

The receptacles used in floor boxes are generally cylindrical and have a top with openings into which the prongs of an electrical plug can be inserted, and they also have mounting straps for securing them in the floor box. These straps extend across the bottom of the receptacle and part way up opposite sides of the receptacle, and they are then bent radially outwardly to form mounting flanges or ears. These radially extending flanges or ears have tapped openings or, in some instances, clearance holes into which a machine screw can be threaded or slipped through to secure the receptacle in the floor box. Generally, the receptacles are secured to a mounting plate, which, in turn, is positioned in the floor box.

The mounting straps conventionally used for the so-called "short strap" receptacles used in floor boxes have two standard heights for the mounting flanges or ears. There are some variations in these heights due to manufacturing tolerances so that the actual heights of the ears vary quite considerably from each other.

In the interest of a safe and workmanlike installation, it is important that the top surface of the receptacle is not mounted below the surface of the receptacle mounting plate or too high above this surface of the mounting plate to cause interference with replacement of the cover plug for sealing purposes. However, due to the variations in mounting heights discussed above, it has not been possible to achieve this result except by providing a different receptacle mounting plate for each different type of receptacle plug. I have invented a "universal" receptacle mounting plate whereby ten different types of standard short strap receptacles can be secured in the proper position in a floor box.

In the accompanying drawings, I have illustrated a presently preferred embodiment of my receptacle mounting plate in which.

Figure 1:
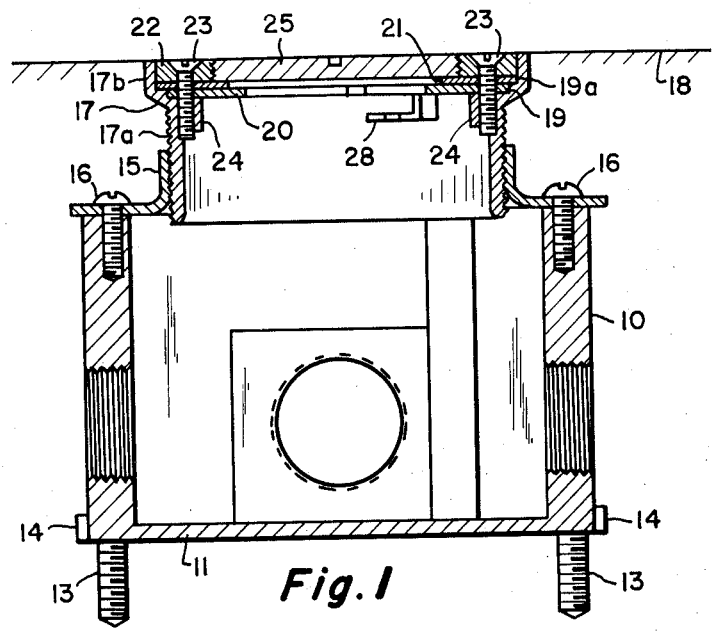
FIGURE 1 is a vertical central section through a floor box with the mounting plate in position in the box but without the receptacle.

FIGURE 1 shows a typical floor box used in concrete floors which comprises a cast iron cylindrical body 10 having an integral bottom 11. Leveling screws 13 pass through ears 14 which extend radially outwardly from the body 10, the ears being spaced approximately 90° from each other around the body. These screws are used to place the box at approximately the proper level in a concrete form before concrete for the floor is poured around the box.

A collar 15 having a diameter less than the diameter of the body 10 is secured to the top of the body by machine screws 16. The sleeve 15 has internal threads, and an adjusting ring 17 having external threads 17a is threaded into the collar. The ring 17 is turned to bring the top of the floor box flush with the finished concrete (or tile) floor which is indicated by the line 18.

The adjusting ring 17 has an enlarged portion 17b above the threads 17a. Two internal shoulders 19 and 19a are formed inside the portion 17b of the ring and extend around the interior of the ring, the shoulder 19a having a larger diameter than the shoulder 18, as shown in FIGURE 1. A circular receptacle mounting plate 20 (hereinafter more fully described) rests on the shoulder 19, and a sealing gasket 21 rests on the shoulder 19a. A cover ring 22 rests on the gasket 21 and is secured to the adjusting ring by two machine screws 23 which thread into bosses 24 formed inside the portion 17b of the ring. The covering 22 has a central opening which is interiorly threaded to receive an exteriorly threaded cover plug 25.

Figure 2:
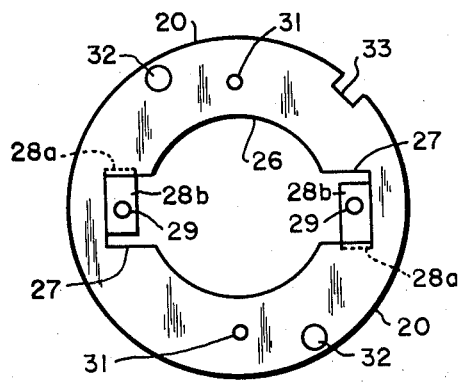
FIGURE 2 is a plan view of the mounting plate.
Figure 3:
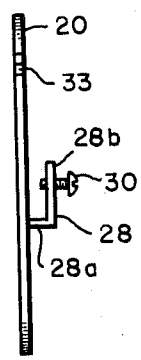
FIGURE 3 is a side view of the plate shown in FIGURE 2.
Figure 4:
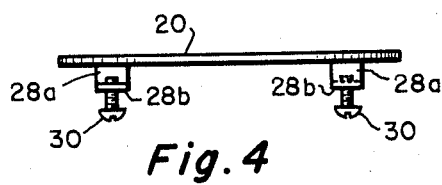
FIGURE 4 is a front view of the plate shown in FIGURE 2.

FIGURES 2, 3 and 4 shows the receptacle mounting plate 20. It is a circular plate having a central circular opening 26 to receive the upper portion of an electrical receptacle. Two diametrically opposed recesses 27 extend radially outwardly from the edge of the central opening. A part of the metal of the circular plate which was removed to form the recesses 27 is used to form two lugs 28 which are positioned radially outward from the edge of the central opening 26 on opposite sides of the center of the opening. Each lug has a leg 28a which extends at right angles from the plane of the central opening and a leg 28b which extends generally parallel to, but spaced away from, the plane of the central opening. The legs 28b have tapped openings 29 which receive screws 30 whereby the mounting straps of the receptacles can be secured to the lugs 28.

The receptacle mounting plate 20 also has two tapped holes 31 which are positioned with respect to each other and the center of the central opening 26 in the same manner as the tapped holes 29 in the lugs 28. Machine screws similar to the machine screws 30 can be threaded into these holes to secure the mounting straps of a receptacle directly to the plate 20.

The plate 20 also has two holes 32 through which the machine screws 23 pass to secure the cover ring 22 to the adjusting ring 17. The plate also has a guide notch 33 which coperates with a raised boss (not shown) on the shoulder 18 to position the plate in the ring 17 so that the openings 32 in the plate will be in line with the tapped openings in the bosses 24 which receive the machine screws 23.

FIGURES 5 to 9, inclusive, show various ways in which a receptacle can be mounted in the receptacle mounting plate 20 so that the top of the receptacle will be flush, or approximately so, with the top of the mounting plate.

Figure 5:
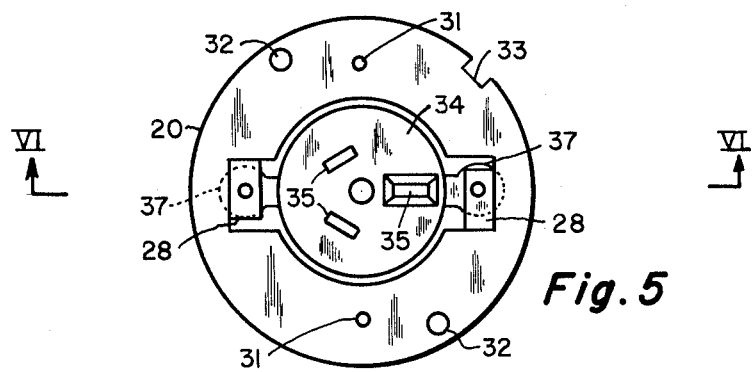
FIGURE 5 is a plan view of a receptacle mounting plate with a receptacle installed therein.
Figure 6:
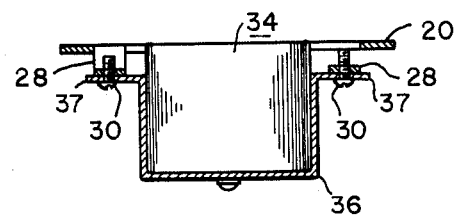
FIGURE 6 is a section along the lines VI—VI of FIGURE 5.

FIGURES 5 and 6 show a cylindrical receptacle 34 having openings 35 in its top surface to receive the prongs of an electrical attachment plug. The receptacle has a mounting strap 36 which extends across the bottom of a receptacle and up opposite sides of the receptacle. The ends of the strap are bent outwardly to form flanges or ears 37 which have holes to receive machine screws 30 whereby the strap (and the receptacle) is secured to the lugs 28 of the receptacle mounting plate 20. The length of the strap 36 shown in FIGURES 5 and 6 is such that the flanges 37 are mounted beneath the lugs 28 in order to make the top of the receptacle flush with the circular plate and positioned immediately below the cover plug 25.

Figure 7:
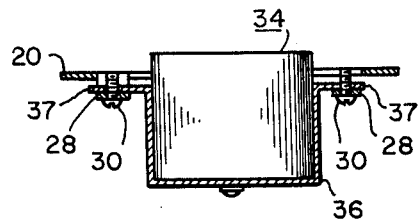
FIGURES 7, 8 and 9 are sections similar to FIGURE 6, but showing different ways of mounting a receptacle on the receptacle mounting plate so as to accommodate receptacles having mounting straps of varying lengths.
Figure 8:
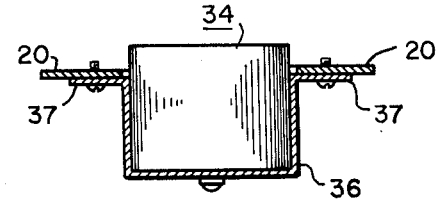
Figure 9:
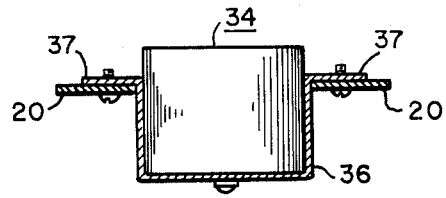

In FIGURE 7, the length of the strap 36 for the receptacle there shown is such that the flanges 37 are mounted on top of the lugs 28. In FIGURES 8 and 9, there are shown receptacles having straps 36 of such height that they are secured to the plate 20 directly by means of machine screws threaded through the opposed holes 31. In FIGURE 8, the length of the strap 36 for the receptacle there shown is such that it is mounted beneath the plate 20 whereas in FIGURE 9, the length of the strap on the receptacle there shown is such that it is mounted on top of the plate 20.

At the present time, short strap receptacles have mounting straps which are standardized into two different heights. Accordingly, the legs 28b of the lugs 28 are spaced from the plane of the central opening 26 of the mounting plate a distance equal to the difference in the two standard strap lengths (approximately ¼ inch). Thus, four mounting surfaces are provided; the top and bottom surfaces of the lugs and the top and bottom surfaces of the plate. By mounting the flanges 37 of the mounting straps against one of these four surfaces, it is possible to bring the top of the receptacle quite close to the top of the mounting plate, in spite of manufacturing variations in the two standard heights.

From the foregoing, it is apparent that I have invented a receptacle mounting plate which will accommodate in a floor outlet receptacle having mounting straps varying in length. It is not necessary to provide a different receptacle mounting plate for each receptacle having one of the two standard lengths of mounting straps. It is also possible to at least partially compensate for variations in heights of individual straps of a nominal standard height.

While I have described a certain presently preferred embodiment of my invention, it is to be understood that it may be otherwise variously embodied within the scope of the appended claims.

I claim:
1. A receptacle mounting plate comprising,
   (A) a circular plate having
      (1) a central circular opening to receive the upper portion of an electrical receptacle, and
   (B) two lugs
      (1) formed from material in said plate which material is positioned radially outward from the edge of said opening on opposite sides of the center of the opening
      (2) said lugs having surfaces which extend in a plane parallel to, but spaced away from the plane of said opening;
      (3) said lugs having holes to receive screws to secure a receptacle mounting strap to the lugs, the holes and the center of the opening being in line with each other.
2. A receptacle mounting plate as described in claim 1 in which said circular plate has a pair of holes to receive screws to secure a receptacle mounting strap to the plate, said holes being positioned on opposite sides of the center of the opening, the center and the two holes being in line and the two holes being spaced from each other the same distance that the holes in said lugs are spaced from each other, said holes also being spaced away from said lugs.

References Cited in the file of this patent
UNITED STATES PATENTS

| | | |
|---|---|---|
| 1,869,841 | Buchanan | Aug. 2, 1932 |
| 3,027,416 | Kissel | Mar. 27, 1962 |

FOREIGN PATENTS

| | | |
|---|---|---|
| 1,021,048 | Germany | Dec. 19, 1957 |